United States Patent
Josyula

(10) Patent No.: US 10,237,090 B2
(45) Date of Patent: Mar. 19, 2019

(54) RULE-BASED NETWORK IDENTIFIER MAPPING

(71) Applicant: AVAGO TECHNOLOGIES INTERNATIONAL SALES PTE. LIMITED, Singapore (SG)

(72) Inventor: Ramakanth Josyula, Bangalore (IN)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 127 days.

(21) Appl. No.: 15/462,614

(22) Filed: Mar. 17, 2017

(65) Prior Publication Data

US 2018/0123827 A1   May 3, 2018

Related U.S. Application Data

(60) Provisional application No. 62/414,585, filed on Oct. 28, 2016.

(51) Int. Cl.
*H04L 12/28* (2006.01)
*H04L 12/46* (2006.01)

(52) U.S. Cl.
CPC ...... *H04L 12/4633* (2013.01); *H04L 12/4641* (2013.01)

(58) Field of Classification Search
CPC .................. H04L 12/4633; H04L 12/4641
See application file for complete search history.

(56) References Cited

U.S. PATENT DOCUMENTS

| 829,529 A | 8/1986 | Keathley NUM |
| 5,390,173 A | 2/1995 | Spinney |
| 5,802,278 A | 9/1998 | Isfeld |

(Continued)

FOREIGN PATENT DOCUMENTS

| CN | 1735062 | 2/2006 |
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.

(Continued)

*Primary Examiner* — Maharishi V Khirodhar
(74) *Attorney, Agent, or Firm* — Xsensus/Broadcom

(57) ABSTRACT

One embodiment of the present invention provides a switch. The switch includes a storage device, a rule management module, a network identifier module, and a packet processor. During operation, the rule management module stores, in the storage device, a first mapping that maps a virtual network identifier of a tunnel to a rule for classifying traffic. The virtual network identifier identifies a virtualized network associated with the tunnel. The network identifier module generates, for a virtualization manager of a virtual machine, a control packet comprising a representation of the first mapping for a respective local end device. The network identifier module then obtains, from a notification packet from the virtualization manger, a second mapping that maps the virtual network identifier to an identifier of the virtual machine and an identifier of the tunnel.

20 Claims, 8 Drawing Sheets

(56) References Cited

U.S. PATENT DOCUMENTS

| | | |
|---|---|---|
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,816,462 B1 | 11/2004 | Booth, III |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Singhal DATE |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | J Ha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |

(56) References Cited

U.S. PATENT DOCUMENTS

| | | |
|---|---|---|
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland ET AL. |
| 2007/0297406 A1 | 12/2007 | Rooholamini |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |

(56) References Cited

U.S. PATENT DOCUMENTS

| | | |
|---|---|---|
| 2008/0205377 A1 | 8/2008 | Chao |
| 2008/0219172 A1 | 9/2008 | Mohan |
| 2008/0225852 A1 | 9/2008 | Raszuk |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085557 A1 | 4/2011 | Gnanasekaran |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |

(56) References Cited

U.S. PATENT DOCUMENTS

| | | |
|---|---|---|
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Manfred |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1 | 12/2013 | Nakil |
| 2013/0332660 A1 | 12/2013 | Talagala |
| 2013/0336104 A1 | 12/2013 | Talla |
| 2013/0346583 A1 | 12/2013 | Low |
| 2014/0010239 A1 | 1/2014 | Xu |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |

(56) References Cited

U.S. PATENT DOCUMENTS

| | | |
|---|---|---|
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195695 A1 | 7/2014 | Okita |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0348168 A1 | 11/2014 | Singh |
| 2014/0355477 A1 | 12/2014 | Moopath |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0036774 A1* | 2/2016 | Chong ............... H04L 45/02 370/392 |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Soderlund |
| 2017/0012880 A1 | 1/2017 | Yang |
| 2017/0026197 A1 | 1/2017 | Venkatesh |
| 2017/0097841 A1 | 4/2017 | Chang |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 215, U.S. Appl. No. 13/098,490, filed May 2, 2011.

Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.

Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.

Office Action for U.S. Appl. No. 13/092,873, filed Apr. 22, 2011, dated Nov. 29, 2013.

Perlman, Radia et al., 'RBridges: Base Protocol Specification; Draft-ietf-trill-rbridge-protocol-16.txt', Mar. 3, 2010, pp. 1-117.

'An Introduction to Brocade VCS Fabric Technology', BROCADE white paper, http://community.brocade.com/docs/DOC-2954, Dec. 3, 2012.

'RBridges: Base Protocol Specification', IETF Draft, Perlman et al., Jun. 26, 2009.

Abawajy J. "An Approach to Support a Single Service Provider Address Image for Wide Area Networks Environment" Centre for

(56) References Cited

OTHER PUBLICATIONS

Parallel and Distributed Computing, School of Computer Science Carleton University, Ottawa, Ontario, K1S 5B6, Canada.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated Jun. 8, 2015, U.S. Appl. No. 14/178,042, filed Feb. 11, 2014.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, for U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office Action dated May 21, 2015, U.S. Appl. No. 13/288,822, filed Nov. 3, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office action dated Apr. 30, 2015, U.S. Appl. No. 13/351,513, filed Jan. 17, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Apr. 1, 2015 U.S. Appl. No. 13/656,438 filed Oct. 19, 2012.
Office Action dated Jun. 6, 2014, U.S. Appl. No. 13/669,357, filed Nov. 5, 2012.
Office Action Dated Jun. 10, 2015, U.S. Appl. No. 13/890,150, filed May 8, 2013.
Brocade, 'Brocade Fabrics OS (FOS) 6.2 Virtual Fabrics Feature Frequently Asked Questions', pp. 1-6, 2009 Brocade Communications Systems, Inc.
Brocade, 'Fastlron and Turbolron 24x Configuration Guide', Feb. 16, 2010.
Brocade, 'The Effortless Network: Hyperedge Technology for the Campus LAN' 2012.

(56) References Cited

OTHER PUBLICATIONS

Brocade 'An Introduction to Brocade VCS Fabric Technology', Dec. 3, 2012.
Brocade Brocade Unveils The Effortless Network, http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FasIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-narten-n vo3-over l ay-problem-statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,752, filed Apr. 22, 2011, from Park, Jung H., dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.

(56) References Cited

OTHER PUBLICATIONS

Office Action for U.S. Appl. No. 13/050,102, filed Mar. 17, 2011, dated Jan. 26, 2015.
Office Action for U.S. Appl. No. 13/087,239, filed Apr. 14, 2011, dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, dated Jul. 18, 2013, dated Jul. 18, 2013.
Office Action for U.S. Appl. No. 13/425,238, filed Mar. 20, 2012, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Rosen, E. et al., "BGP/MPLS VPNs", Mar. 1999.
S. Nadas et al., 'Virtual Router Redundancy Protocol (VRRP) Version 3 for IPv4 and IPv6', Internet Engineering Task Force, Mar. 2010.
Siamak Azodolmolky et al. "Cloud computing networking: Challenges and opportunities for innovations", IEEE Communications Magazine, vol. 51, No. 7, Jul. 1, 2013.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.

(56) References Cited

OTHER PUBLICATIONS

Office Action for U.S. Appl. No. 14/510, 913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.
Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.

\* cited by examiner

| MAC ADDRESS | VLAN ID | INTERFACE |
|---|---|---|
| MAC 136 | VLAN 110 | INT. 133 |
| MAC 138 | VLAN 110 | INT. 135 |
| MAC 152 | VLAN 110 | TUNNEL 106 |
| MAC 153 | VLAN 110 | TUNNEL 106 |
| MAC 154 | VLAN 110 | TUNNEL 106 |
| MAC 155 | VLAN 110 | TUNNEL 106 |
| MAC 156 | VLAN 110 | TUNNEL 106 |
| MAC 157 | VLAN 110 | TUNNEL 106 |
| MAC 158 | VLAN 110 | TUNNEL 106 |
| MAC 159 | VLAN 110 | TUNNEL 106 |

| SEQUENCE | RULE | VLAN ID | VNI ID |
|---|---|---|---|
| 1 | RULE 172 | VLAN 110 | VNI 162 |
| 2 | RULE 174 | VLAN 110 | VNI 164 |

| TUNNEL ID | MAC ADDRESS | VNI ID |
|---|---|---|
| TUNNEL 106 | MAC 136 | VNI 162 |
| TUNNEL 106 | MAC 138 | VNI 164 |

| TUNNEL ID | MAC ADDRESS | VNI ID |
|---|---|---|
| TUNNEL 106 | MAC 152 | VNI 162 |
| TUNNEL 106 | MAC 153 | VNI 162 |
| TUNNEL 106 | MAC 154 | VNI 162 |
| TUNNEL 106 | MAC 155 | VNI 162 |
| TUNNEL 106 | MAC 156 | VNI 164 |
| TUNNEL 106 | MAC 157 | VNI 164 |
| TUNNEL 106 | MAC 158 | VNI 164 |
| TUNNEL 106 | MAC 159 | VNI 164 |

RULE-BASED NETWORK IDENTIFIER MAPPING

RELATED APPLICATION

This application claims the benefit of U.S. Provisional Application No. 62/414,585, titled "Flow based VNI Mapping in VXLAN Gateway," by inventor Ramakanth Josyula, filed 28 Oct. 2016, the disclosure of which is incorporated by reference herein.

The present disclosure is related to U.S. Pat. No. 8,867,552, application Ser. No. 13/087,239, titled "Virtual Cluster Switching," by inventors Suresh Vobbilisetty and Dilip Chatwani, issued 21 Oct. 2014, filed 14 Apr. 2011, the disclosure of which is incorporated by reference herein.

BACKGROUND

Field

The present disclosure relates to communication networks. More specifically, the present disclosure relates to a system and a method for facilitating rule-based network identifiers for separation of traffic in a tunnel.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as efficient forwarding of multi-destination (e.g., broadcast, unknown unicast, and multicast) traffic. However, the capabilities of a switch cannot grow infinitely. It is limited by physical space, power consumption, and design complexity, to name a few factors. Furthermore, switches with higher capability are usually more complex and expensive. As a result, increasing efficiency in existing capabilities of a switch adds significant value proposition.

Typically, to expand a lower layer network across a higher layer network (e.g., an Ethernet network over an Internet Protocol (IP) network), a tunnel is established between two tunnel endpoints. If a device in a segment of a lower layer network cannot establish a tunnel, a tunnel gateway is used. A tunnel gateway can originate or terminate tunnels for the devices in that network segment. The tunnel gateway can be a distributed (or virtual) tunnel endpoint, which can be associated with a plurality of switches operating as a single, logical tunnel endpoint. A tunnel endpoint for a tunnel can originate or terminate tunnel forwarding for the tunnel.

While a distributed tunnel endpoint brings many desirable features in forwarding traffic via tunnels, some issues remain unsolved in facilitating the separation of traffic via a tunnel.

SUMMARY

One embodiment of the present invention provides a switch. The switch includes a storage device, a rule management module, a network identifier module, and a packet processor. During operation, the rule management module stores, in the storage device, a first mapping that maps a virtual network identifier of a tunnel to a rule for classifying traffic. The virtual network identifier identifies a virtualized network associated with the tunnel. The network identifier module generates, for a virtualization manager of a virtual machine, a control packet comprising a representation of the first mapping for a respective local end device. The network identifier module then obtains, from a notification packet from the virtualization manger, a second mapping that maps the virtual network identifier to an identifier of the virtual machine and an identifier of the tunnel.

In a variation on this embodiment, the packet processor encapsulates a packet destined to the virtual machine with an encapsulation header and incorporates the virtual network identifier in the encapsulation header based on the second mapping.

In a variation on this embodiment, the switch also includes a tunnel management module, which operates the switch as a tunnel endpoint for the tunnel. The switch is then associated with an Internet Protocol (IP) address assigned to the tunnel endpoint.H In a further variation, the tunnel endpoint operates based on a tunneling protocol, which can be one of: virtual extensible local area network (LAN) (VXLAN), generic routing encapsulation (GRE), network virtualization using GRE (NVGRE), layer-2 tunneling protocol (L2TP), and multi-protocol label switching (MPLS).

In a variation on this embodiment, the rule is based on one or more of: a flow definition, a flow identifier assigned to a flow defined by a flow definition, a media access control (MAC) address, an IP address, an IP subnet, a customer VLAN tag, a service VLAN, and a global VLAN tag.

In a further variation, the flow definition identifies a packet belonging to a flow. The flow definition can be based on one or more of: a source MAC address of the packet, a destination MAC address of the packet, a source IP address of the packet, a destination IP address of the packet, an ingress port of the tunnel endpoint, and a transport protocol port.

In a variation on this embodiment, the switch is a member of a network of interconnected switches, which is identified based on a fabric identifier. The network of interconnected switches operates as a tunnel endpoint for the tunnel.

In a variation on this embodiment, the first mapping further comprises a VLAN identifier and a sequence number of the rule.

In a variation on this embodiment, the virtual network identifier is a VXLAN network identifier (VNI).

BRIEF DESCRIPTION OF THE FIGURES

FIG. 1B illustrates an exemplary media access control (MAC) address table facilitating rule-based network identifier mapping for a tunnel, in accordance with an embodiment of the present invention.

FIG. 1C illustrates an exemplary rule mapping table facilitating rule-based network identifier mapping for a tunnel, in accordance with an embodiment of the present invention.

FIG. 1D illustrates an exemplary network identifier allocation table facilitating rule-based network identifier mapping for a tunnel, in accordance with an embodiment of the present invention.

FIG. 1E illustrates an exemplary MAC mapping table facilitating rule-based network identifier mapping, in accordance with an embodiment of the present invention.

In the figures, like reference numerals refer to the same figure elements.

DETAILED DESCRIPTION

Figure 1A:
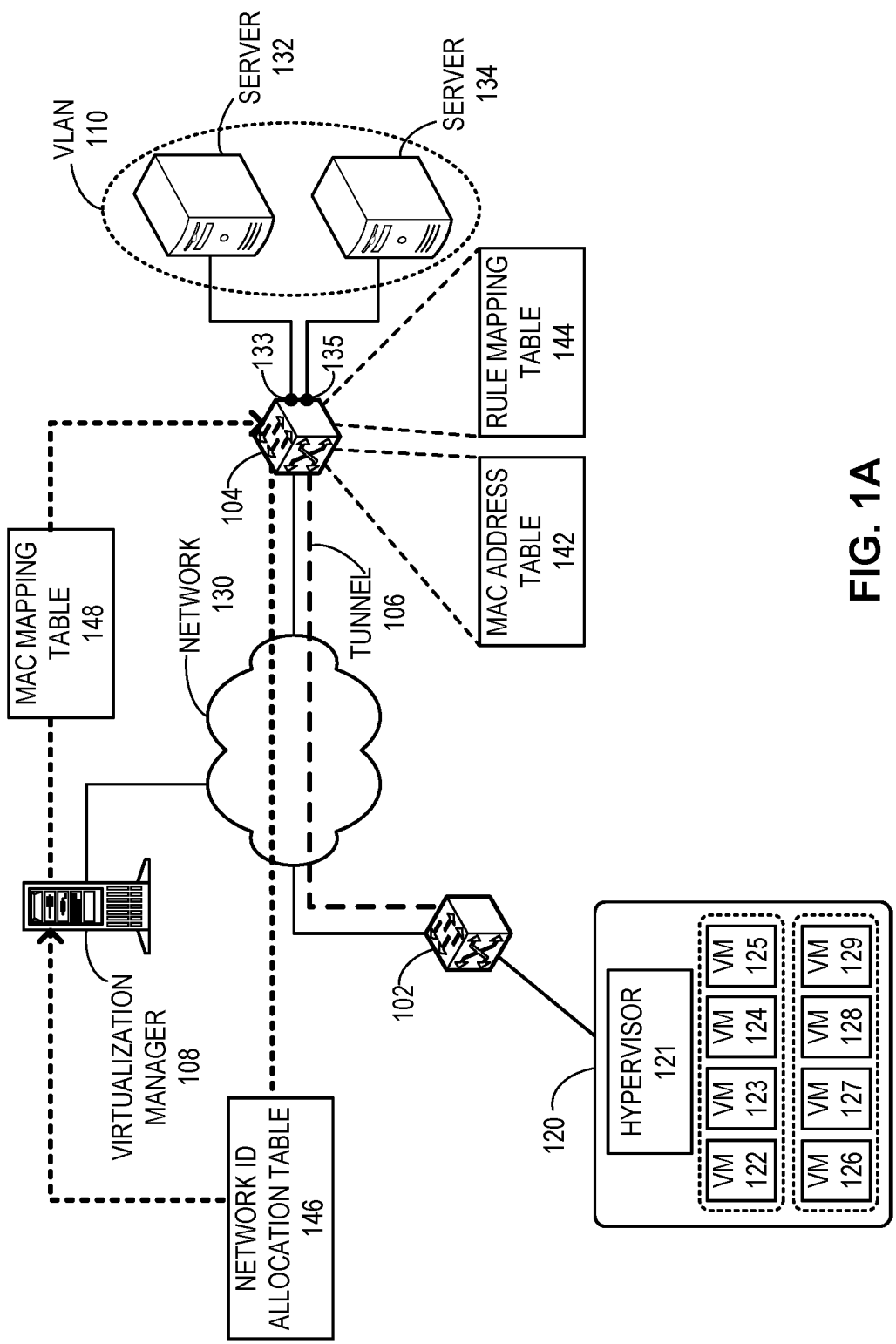
FIG. 1A illustrates an exemplary tunnel endpoint with rule-based network identifier mapping support for a tunnel, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently facilitating traffic separation in a tunnel is solved by (i) allocating a network identifier to a respective rule for a tunnel; and (ii) obtaining a mapping between a network identifier and a corresponding media access control (MAC) address from a virtualization manager. A tunnel endpoint can be a switch (or any computing device) capable of originating or terminating a tunnel encapsulation header. To forward a packet via the tunnel, the tunnel endpoint encapsulates the packet with an encapsulation header associated with a corresponding tunneling protocol. The source and destination addresses in the encapsulation header correspond to the tunnel endpoints of the tunnel. Examples of a tunneling protocol include, but are not limited to, virtual extensible LAN (VXLAN), generic routing encapsulation (GRE), network virtualization using GRE (NVGRE), layer-2 tunneling protocol (L2TP), and multi-protocol label switching (MPLS).

With existing technologies, different virtual local area networks (VLANs) are mapped to different corresponding network identifiers for a tunnel. A tunnel endpoint can include the network identifier in the encapsulation header associated with the tunnel. For example, if the tunneling protocol is VXLAN, the tunnel endpoint can be a virtual tunnel endpoint (VTEP), which maps a VXLAN network identifier (VNI) to a corresponding VLAN. As a result, packets belonging to different VLANs are separated in the tunnel. However, such allocation limits the traffic separation to only VLANs. Under such circumstances, other forms of traffic separation may not be available.

To solve this problem, a tunnel endpoint can allocate a network identifier based on a rule defined at the tunnel endpoint. A rule can be based on, but is not limited to, a flow definition, a flow identifier assigned to a flow defined by a flow definition, a source MAC address, a source Internet Protocol (IP) address, an IP subnet, a customer VLAN tag, a service VLAN tag, a global VLAN tag. A flow can be defined based on one or more of: a source MAC address, a destination MAC address, a source IP address, a destination IP address, an ingress port of the tunnel endpoint, and a transport protocol port (e.g., associated with a socket). The tunnel endpoint maps a respective network identifier to one or more corresponding MAC addresses based on the rule associated with the network identifier, and provides the mapping to a virtualization manager.

In some embodiments, a virtualization manager creates and manages a set of virtual machines running on one or more virtual machine monitors (VMMs) (e.g., hypervisors or Hyper-Vs). Upon receiving the mapping, the virtualization manager maps the virtual MAC addresses of these virtual machines to corresponding network identifiers and provides the mapping to the tunnel endpoint. The tunnel endpoint then updates the local MAC address table, based on the mapping. It should be noted that one or more entries of the MAC address table can also be populated based on layer-2 MAC address learning. Upon identifying a packet with a destination address associated with one of the virtual MAC addresses, the tunnel endpoint encapsulates the packet with a tunnel encapsulation header and sends the encapsulated packet via the tunnel. In some embodiments, the tunnel endpoint is in a distributed tunnel endpoint, which includes a plurality of tunnel endpoints operating based on virtual router redundancy protocol (VRRP).

In some embodiments, the tunnel endpoint can be a member switch of a network of interconnected switches (e.g., a fabric switch). In a fabric switch, any number of switches coupled in an arbitrary topology can be controlled as a single logical switch. The fabric switch can be an Ethernet fabric switch or a virtual cluster switch (VCS), which can operate as a single Ethernet switch. In some embodiments, a respective switch in the fabric switch is an Internet Protocol (IP) routing-capable switch (e.g., an IP router). In some further embodiments, a respective switch in the fabric switch is a Transparent Interconnection of Lots of Links (TRILL) routing bridge (RBridge).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary physical topology, and does not require extensive manual configuration. The switches can reside in the same location, or be distributed over different locations. These features overcome the inherent limitations of switch stacking and make it possible to build a large "switch farm,"

which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified by a fabric identifier (e.g., a cluster identifier), which is assigned to the fabric switch. Since a fabric switch can be represented as a logical chassis, the fabric identifier can also be referred to as a logical chassis identifier. A respective member switch of the fabric switch is associated with the fabric identifier. In some embodiments, a fabric switch identifier is pre-assigned to a member switch. As a result, when the switch joins a fabric switch, other member switches identifies the switch to be a member switch of the fabric switch.

In this disclosure, the term "fabric switch" refers to a number of interconnected physical switches which can form a single, scalable network of switches. The member switches of the fabric switch can operate as individual switches. The member switches of the fabric switch can also operate as a single logical switch in the provision and control plane, the data plane, or both. "Fabric switch" should not be interpreted as limiting embodiments of the present invention to a plurality of switches operating as a single, logical switch. In this disclosure, the terms "fabric switch" and "fabric" are used interchangeably.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end host" can refer to any device external to a network (e.g., does not perform forwarding in that network). Examples of an end host include, but are not limited to, a physical or virtual machine, a conventional layer-2 switch, a layer-3 router, or any other type of network device. Additionally, an end host can be coupled to other switches or hosts further away from a layer-2 or layer-3 network. An end host can also be an aggregation point for a number of network devices to enter the network. An end host hosting one or more virtual machines can be referred to as a host machine. In this disclosure, the terms "end host" and "host machine" are used interchangeably.

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. A link between inter-switch ports is referred to as an "inter-switch link." The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, an RBridge identifier, or a combination thereof. In this disclosure, "switch identifier" is used as a generic term, is not limited to any bit format, and can refer to any format that can identify a switch.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary tunnel endpoint with rule-based network identifier mapping support for a tunnel, in accordance with an embodiment of the present invention. A tunnel endpoint 104 facilitates rule-based network identifier mapping. In this example, switches 102 and 104 operate as tunnel endpoints for a tunnel 106 across network 130. Hence, switches 102 and 104 can also be referred to as tunnel endpoints 102 and 104, respectively. In some embodiments, tunnel endpoint 104 is in a distributed tunnel endpoint, which includes a plurality of tunnel endpoints operating based on VRRP (not shown in FIG. 1A). Network 130 can be a local area network, a wide area network, or the Internet. Tunnel 130 can be established based on a tunneling protocol. Examples of a tunneling protocol include, but are not limited to, VXLAN, GRE, NVGRE, L2TP, and MPLS.

Tunnel endpoint 104 is coupled to servers 132 and 134 via local ports 133 and 135, respectively. Servers 132 and 134 belong to a VLAN 110. Therefore, ports 133 and 135 are configured with VLAN 110. On the other hand, tunnel endpoint 102 is coupled to a host machine 120 running a VMM, which is a hypervisor 121 running a plurality of virtual machines 122, 123, 124, 125, 126, 127, 128, and 129. In some embodiments, a virtualization manager 108 creates and manages this set of virtual machines. Virtualization manager 108 can be a virtualization controller (e.g., VMware NSX controller) and in a cluster. In this example, each of these virtual machines belongs to VLAN 110. To extend VLAN 110 across network 130, a hypervisor can establish a VXLAN tunnel. However, servers 132 and 134 may not support VXLAN. Hence, tunnel endpoint 104 operates as a tunnel gateway for servers 132 and 134.

To forward a packet from server 132 (or 134) via tunnel 106, tunnel endpoint 104 encapsulates the packet with an encapsulation header associated with the tunneling protocol. The source and destination addresses of the encapsulation header correspond to the tunnel endpoints 104 and 102, respectively. The encapsulation header further includes a network identifier. With existing technologies, this network identifier distinguishes traffic belonging to different local networks, such as VLANs. To do so, different VLANs are mapped to different corresponding network identifiers. For example, if the tunneling protocol is VXLAN, tunnel endpoints 102 and 104 can operate as VTEPs and map a VNI to a corresponding VLAN. As a result, packets belonging to different VLANs are separated in tunnel 130. However, such allocation limits the traffic separation in tunnel 130 to only VLANs. Under such circumstances, other forms of traffic separation may not be available.

To solve this problem, tunnel endpoint 104 can allocate a network identifier based on a locally defined rule. In some embodiments, a network administrator can define such a rule at tunnel endpoint 104 using an access control list (ACL). Such a rule can be based on, but is not limited to, a flow definition, a flow identifier assigned to a flow defined by a flow definition, a source MAC address, a source IP address, an IP subnet, a customer VLAN tag, a global VLAN tag. A flow can be defined based on one or more of: a source MAC address, a destination MAC address, a source IP address, a destination IP address, an ingress port of the tunnel endpoint, and a transport protocol port (e.g., associated with a socket).

Tunnel endpoint 104 stores a respective rule and a corresponding network identifier in an entry in a rule mapping table 144. Tunnel endpoint 104 represents each entry in rule mapping table 144 based on MAC addresses of servers 132 and 134 to generate a network identifier allocation table 146. Network identifier allocation table 146 maps a respective network identifier to one or more corresponding MAC addresses of servers 132 and 134 based on the rule associated with the network identifier. Tunnel endpoint 104 then provides network identifier allocation table 146 to virtualization manager 108.

Upon receiving network identifier allocation table 146, virtualization manager 108 maps the virtual MAC addresses of virtual machines 122, 123, 124, 125, 126, 127, 128, and 129 to corresponding network identifiers based on their respective usage and configuration. Virtualization manager 108 then stores these mappings in a MAC mapping table 148. Suppose that these virtual machines belong to a business entity, and servers 132 and 134 provide two different services to the business entity (e.g., printing service and mail service). If virtual machines 122, 123, 124, and 125 use the service provided by server 132, virtualization manager 108 maps the MAC addresses of virtual machines 122, 123, 124, and 125 to the network identifier mapped to server 132. In the same way, if virtual machines 126, 127, 128, and 129 use the service provided by server 134, virtualization manager 108 maps the MAC addresses of virtual machines 126, 127, 128, and 129 to the network identifier mapped to server 134.

Virtualization manager 108 then sends MAC mapping table 148 to tunnel endpoint 104, which stores MAC mapping table 148 in a local storage device. Tunnel endpoint 104 then updates a local MAC address table 144 based on MAC mapping table 148. These entries can indicate tunnel 106 as the egress interface. It should be noted that one or more entries of MAC address table 144 can also be populated based on layer-2 MAC address learning.

For example, upon learning MAC addresses of servers 132 and 134, tunnel endpoint 104 generates respective entries comprising the MAC addresses of servers 132 and 134 mapping to ports 133 and 135, respectively, as egress ports. Upon identifying a packet with a destination address associated with one of the virtual MAC addresses, tunnel endpoint 104 encapsulates the packet with a tunnel encapsulation header and sends the encapsulated packet via tunnel 106 to tunnel endpoint 102. Tunnel endpoint 102 decapsulates the encapsulation header and forwards the packet to the corresponding virtual machine.

Mapping Tables

FIG. 1B illustrates an exemplary MAC address table facilitating rule-based network identifier mapping for a tunnel, in accordance with an embodiment of the present invention. In this example, MAC address table 142 maps a MAC address and a corresponding VLAN identifier to an interface. Suppose that servers 132 and 134 have MAC addresses 136 and 138, respectively. As described in conjunction with FIG. 1A, upon learning these MAC addresses from interfaces 133 and 135, respectively, tunnel endpoint 104 creates an entry mapping MAC address 136 and its VLAN 110 to interface 133, and another entry mapping MAC address 138 and its VLAN 110 to interface 135.

Similarly, suppose that virtual machines 122, 123, 124, 125, 126, 127, 128, and 129 have MAC addresses 152, 153, 154, 155, 156, 157, 158, and 159, respectively. Based on MAC mapping table 148, tunnel endpoint 104 creates respective entries for MAC addresses 152, 153, 154, 155, 156, 157, 158, and 159. Each of these entries maps the corresponding MAC address and its VFAN 110 to tunnel 106. This allows tunnel endpoint 104 to forward a packet with one of these MAC addresses via tunnel 106.

FIG. 1C illustrates an exemplary rule mapping table facilitating rule-based network identifier mapping for a tunnel, in accordance with an embodiment of the present invention. In this example, rule mapping table 144 maps a respective rule to a corresponding network identifier. As described in conjunction with FIG. 1A, suppose that two rules 172 and 174 are defined for servers 132 and 134, respectively. For example, rules 172 and 174 can specify MAC addresses 136 and 138, respectively, as source addresses. Rule mapping table 144 maps rules 172 and 174 to VNIs 162 and 164, respectively. In some embodiments, rule mapping table 144 further maps sequence numbers 1 and 2 to rules 172 and 174, respectively. These sequence numbers can be rule identifiers and sequentially generated at tunnel endpoint 104. Since MAC addresses 136 and 138 are associated with VLAN 110, rule mapping table 144 can further include rule mapping table 144 can further include VLAN 110.

FIG. 1D illustrates an exemplary network identifier allocation table facilitating rule-based network identifier mapping for a tunnel, in accordance with an embodiment of the present invention. In this example, network identifier allocation table 146 represents a respective rule-to-VNI mapping as one or more MAC address-to-VNI mappings. For example, rules 172 and 174 in rule mapping table 144 correspond to MAC addresses 136 and 138, respectively. Hence, network identifier allocation table 146 maps MAC addresses 136 and 138 to corresponding VNIs 162 and 164, respectively.

Furthermore, since VNIs 162 and 164 are associated with tunnel 106, network identifier allocation table 146 further maps VNIs 162 and 164 to corresponding tunnel 106. In some embodiments, tunnel 106 is identified in network identifier allocation table 146 based on the switch identifiers (e.g., IP addresses) of tunnel endpoints 102 and 104. Since virtualization manager 108 is capable of processing MAC address-to-VNI mapping, virtual manager can generate corresponding mappings for the virtual MAC addresses manages by virtualization manager 108. In this way, rule-based network identifier allocation can be implemented without modifying virtualization manager 108.

FIG. 1E illustrates an exemplary MAC mapping table facilitating rule-based network identifier mapping, in accordance with an embodiment of the present invention. In this example, MAC mapping table 146 maps virtual MAC addresses of virtual machines to corresponding network identifiers based on network identifier allocation table 146. As described in conjunction with FIG. 1A, Since virtual machines 122, 123, 124, and 125 correspond to server 132's MAC address 136, which is mapped to VNI 162, MAC mapping table 148 maps MAC addresses 152, 153, 154, and 155 to VNI 162. In the same way, MAC mapping table 148 maps MAC addresses 156, 157, 158, and 159 to VNI 164. Virtualization manager 108 then provides MAC mapping table 148 to tunnel endpoint 104.

Network of Interconnected Switches

Figure 2:
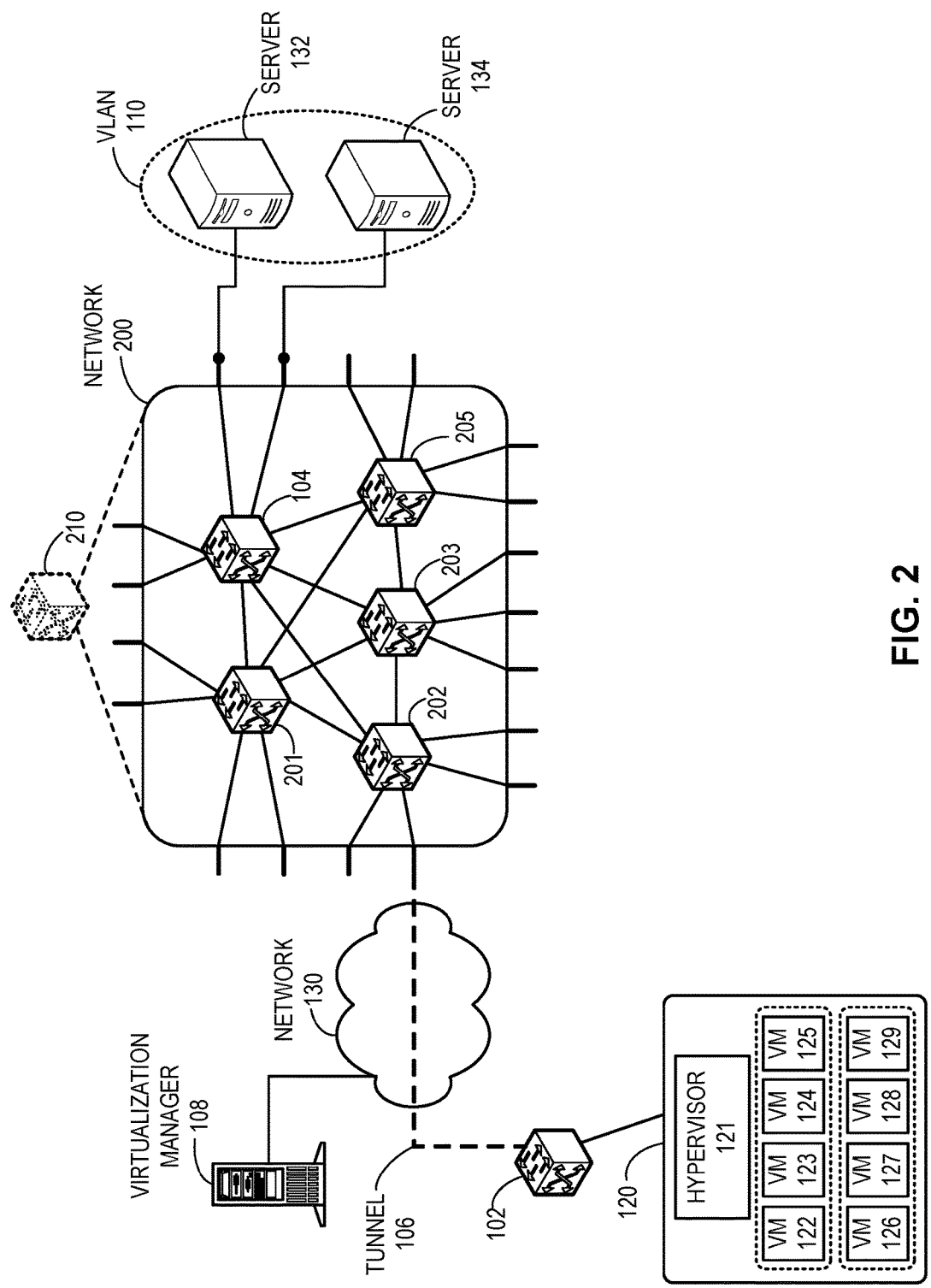
FIG. 2 illustrates an exemplary network of interconnected switched operating as a tunnel endpoint with rule-based network identifier mapping support, in accordance with an embodiment of the present invention.

FIG. 2 illustrates an exemplary network of interconnected switched operating as a tunnel endpoint with rule-based network identifier mapping support, in accordance with an embodiment of the present invention. As illustrated in FIG. 2, tunnel endpoint 104 is a switch a network 200, which also includes switches 201, 202, 203, and 205. Network 200 can operate as a single tunnel endpoint for tunnel 106. Here, servers 132 and 134 are coupled to switch 104. In this example, network 130 is coupled to switch 202.

In some embodiments, network 200 is represented as a virtual switch 210 with a virtual MAC address and a virtual IP address. Tunnel endpoint 102 considers virtual switch 210 as the remote tunnel endpoint for tunnel 106 and identifies virtual switch 210 using the virtual IP and/or MAC addresses. For example, tunnel 106 then can be identified using the IP address of tunnel endpoint 102 and the virtual IP address of virtual switch 210. To operate as a single tunnel endpoint, MAC address table 142 and rule mapping table 144 is shared among a respective switch of network 200.

In some embodiments, network 200 is TRILL network and a respective switch in network 200 is a TRILL RBridge. Inter-switch packet forwarding in network 200 can be based on encapsulating an Ethernet packet received from an end device with a TRILL header. In some further embodiments, network 200 is an IP network and a respective switch of network 200, such as switch 104, is an IP-capable switch, which calculates and maintains a local IP routing table (e.g., a routing information base or RIB), and is capable of forwarding packets based on its IP addresses. Under such a scenario, communication among the switches in network 200 is based on IP or IP-based tunneling. Examples of such a tunneling protocol include, but are not limited to, VXLAN, GRE, L2TP, and MPLS.

In some embodiments, network 200 is a fabric switch (under such a scenario, network 200 can also be referred to as fabric switch 200). Fabric switch 200 is identified by and assigned to a fabric switch identifier (e.g., a fabric label). A respective member switch of fabric switch 200 is associated with that fabric switch identifier. This allows the member switch to indicate that it is a member of fabric switch 200. In some embodiments, whenever a new member switch joins fabric switch 200, the fabric switch identifier is associated with that new member switch. Furthermore, a respective member switch of fabric switch 200 is assigned a switch identifier (e.g., an RBridge identifier, a Fibre Channel (FC) domain ID (identifier), or an IP address). This switch identifier identifies the member switch in fabric switch 200. The fabric label can be included in a header of packet for any inter-fabric and/or intra-fabric communication.

Switches in network 200 use edge ports to communicate with end devices (e.g., non-member switches) and inter-switch ports to communicate with other member switches. For example, switch 104 is coupled to server 132 via an edge port (e.g., port 136) and to switches 201, 202, 203, and 205 via inter-switch ports and one or more links. Data communication via an edge port can be based on Ethernet and via an inter-switch port can be based on a fabric encapsulation protocol (e.g., VXLAN or TRILL). It should be noted that control message exchange via inter-switch ports can be based on a different protocol (e.g., the IP or FC protocol).

Suppose that switch 104 receives a packet from server 132 destined to virtual machine 122. This packet can be an Ethernet frame with MAC address 152 as the destination address. Switch 104 determines (e.g., from MAC address table 142) that the packet should be forwarded via tunnel 106. Switch 104 then encapsulates the packet with a fabric encapsulation header that forwards the packet within network 200. Since network 130 is coupled to switch 202, to initiate forwarding via tunnel 106, switch 104 sets the destination address of the fabric encapsulation header to be the switch identifier of switch 202. For example, if network 200 is a TRILL network, the fabric encapsulation header can be a TRILL header, and the destination address of the fabric encapsulation header can be the RBridge identifier of switch 202. Switch 104 then sends the encapsulated packet to switch 202 via network 200.

Upon receiving the encapsulated packet, switch 202 determines that the destination address of the fabric encapsulation header is assigned to the local switch. Switch 202 then decapsulates the fabric encapsulation header to retrieve the inner packet (i.e., the Ethernet frame). Switch 202 determines from MAC address table 142 that MAC address 152 is reachable via tunnel 106. Switch 202 then encapsulates the packet with a tunnel encapsulation header (e.g., a VXLAN header) and assigns VNI 162 in the tunnel encapsulation header from MAC mapping table 148.

Operations

Figure 3A:
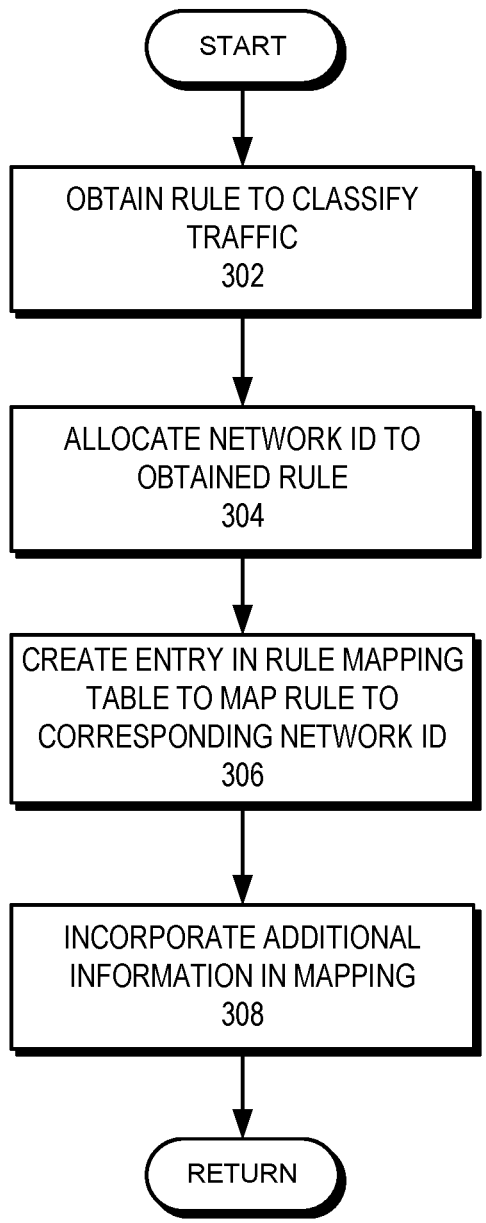
FIG. 3A presents a flowchart illustrating an exemplary process of a tunnel endpoint allocating a network identifier to a rule, in accordance with an embodiment of the present invention.

FIG. 3A presents a flowchart illustrating an exemplary process of a tunnel endpoint allocating a network identifier to a rule, in accordance with an embodiment of the present invention. During operation the tunnel endpoint obtains a rule to classify traffic (operation 302) and allocates a network identifier to the obtained rule (operation 304). The tunnel endpoint then creates an entry in the local rule mapping table to map the rule to a corresponding network identifier (operation 306). This network identifier can be provided by a network administrator or generated by the tunnel endpoint (e.g., based on sequential generation). The tunnel endpoint, optionally, incorporates additional information, such as a sequence number and a VLAN identifier, into the mapping (operation 308).

Figure 3B:
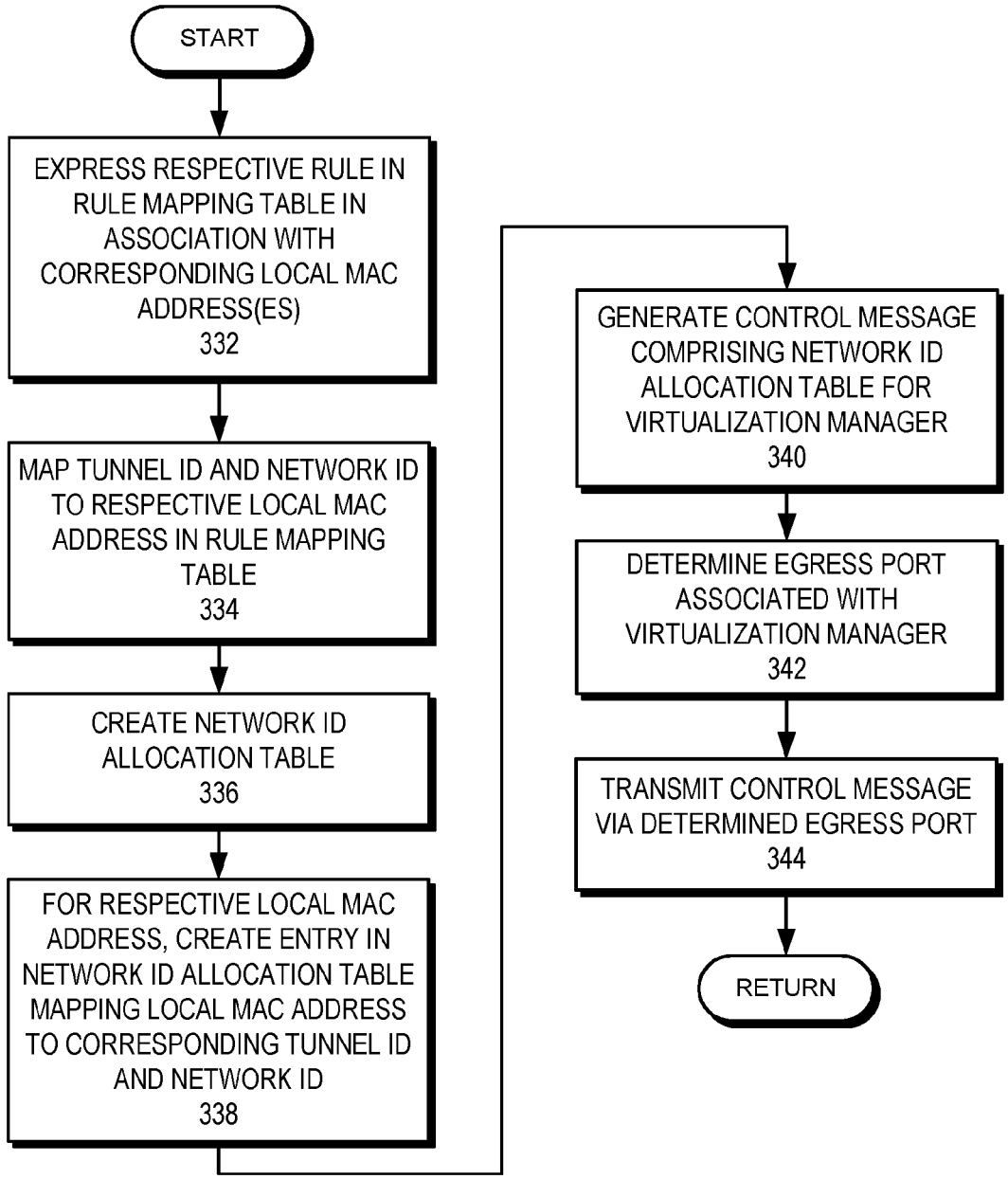
FIG. 3B presents a flowchart illustrating an exemplary process of a tunnel endpoint providing a network identifier allocation table to a virtualization manager, in accordance with an embodiment of the present invention.

FIG. 3B presents a flowchart illustrating an exemplary process of a tunnel endpoint providing a network identifier allocation table to a virtualization manager, in accordance with an embodiment of the present invention. During operation, the tunnel endpoint expresses a respective rule in the rule mapping table in associated with corresponding local MAC address(es) (e.g., locally learned MAC address(es)) (operation 332). The tunnel endpoint maps a tunnel identifier and a network identifier to a respective local MAC address in a rule mapping table (operation 334). The tunnel endpoint creates a network identifier allocation table (operation 336).

For a respective local MAC address, the tunnel endpoint creates an entry in the network identifier allocation table mapping the local MAC address to a corresponding tunnel identifier and a network identifier (operation 338). The tunnel identifier then generates a control message comprising the network identifier allocation table for a virtualization manager (operation 340). The tunnel endpoint determines an egress port associated with virtualization manager (operation 342) and transmits the control message via the determined egress port (operation 344).

Figure 3C:
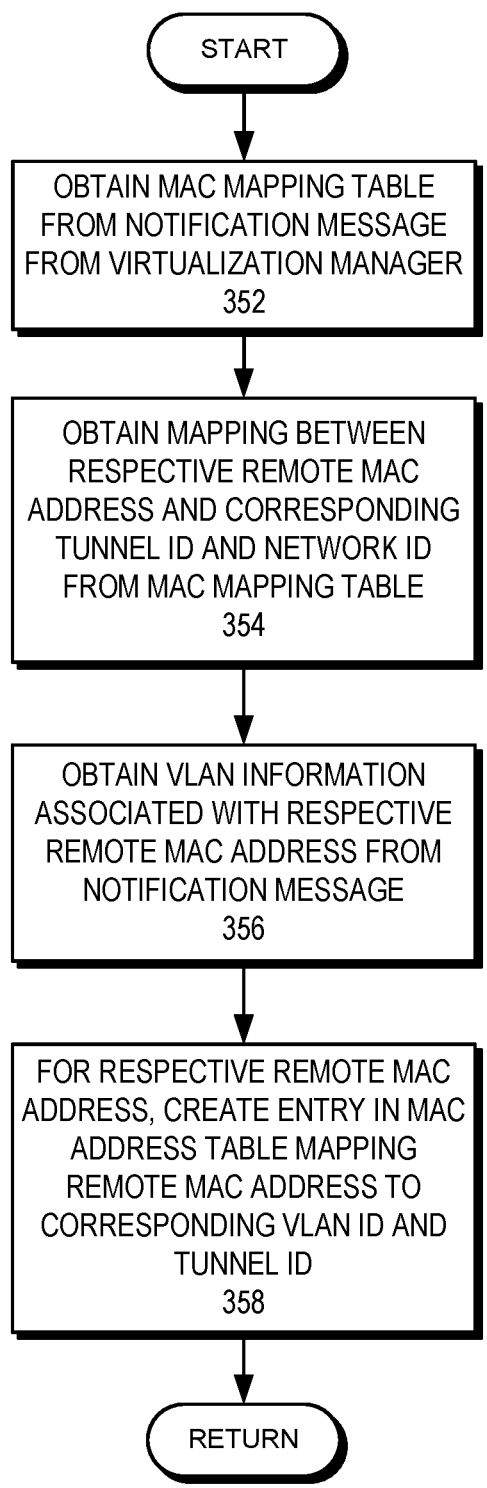
FIG. 3C presents a flowchart illustrating an exemplary process of a tunnel endpoint processing a MAC mapping table received from a virtualization manager, in accordance with an embodiment of the present invention.

FIG. 3C presents a flowchart illustrating an exemplary process of a tunnel endpoint processing a MAC mapping table received from a virtualization manager, in accordance with an embodiment of the present invention. The tunnel endpoint obtains a MAC mapping table from a notification message from the virtualization manager (operation 352). The tunnel endpoint obtains a mapping between a respective remote MAC address (e.g., a virtual MAC address of a virtual machine) and a corresponding tunnel identifier and network identifier from the MAC mapping table (operation 354). The tunnel endpoint obtains VLAN information associated with a respective remote MAC address from the notification message (operation 356). For a respective remote MAC address, the tunnel endpoint creates an entry in the MAC address table mapping the remote MAC address to a corresponding VLAN identifier and a tunnel identifier (operation 358).

Figure 4:
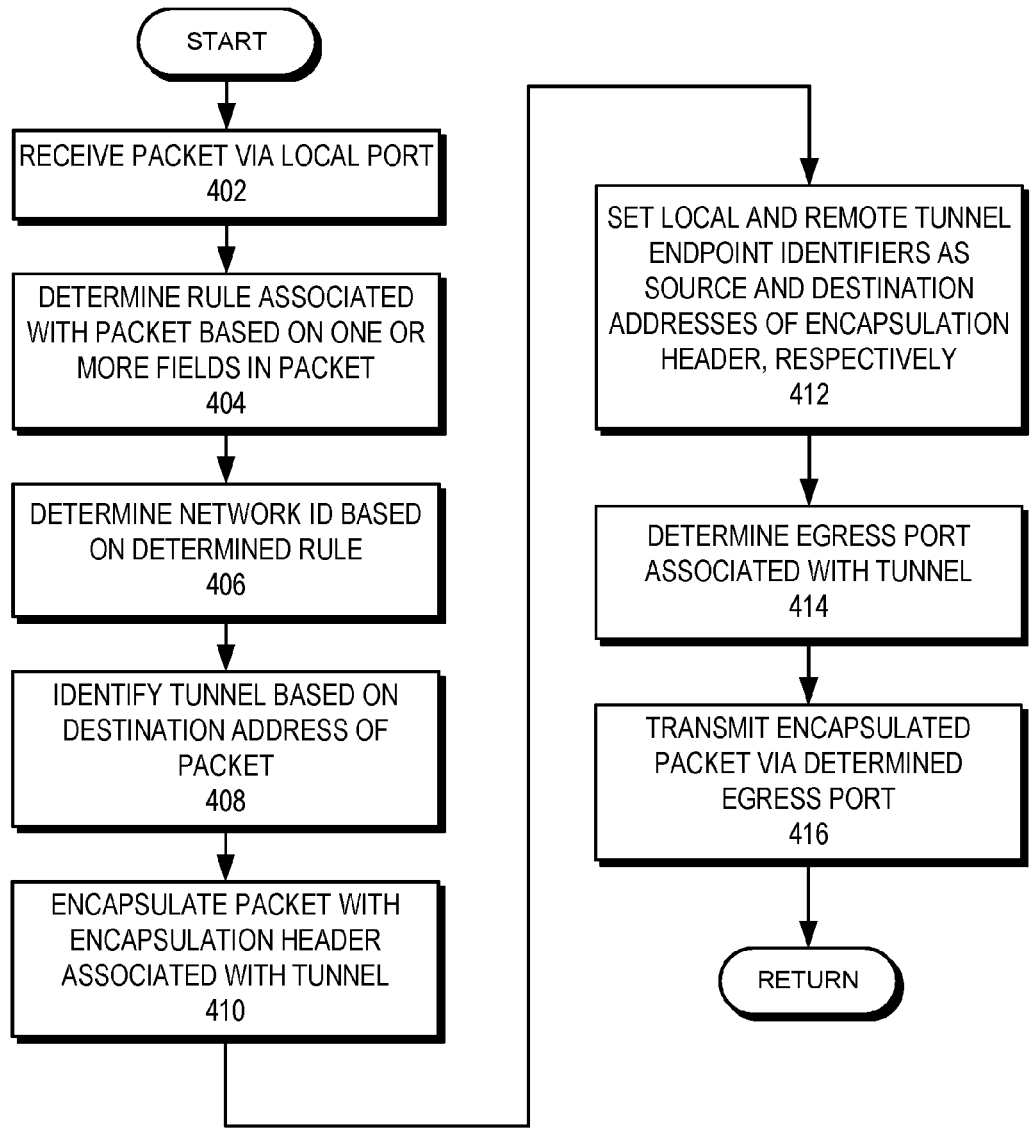
FIG. 4 presents a flowchart illustrating an exemplary process of a tunnel endpoint forwarding a packet, in accordance with an embodiment of the present invention.

FIG. 4 presents a flowchart illustrating an exemplary process of a tunnel endpoint forwarding a packet, in accordance with an embodiment of the present invention. During operation, the tunnel endpoint receives a packet via a local port (operation 402) and determines a rule associated with the packet based on one or more fields in the packet (operation 404). The tunnel endpoint then determines a network identifier based on the determined rule (operation 406) and identifies a tunnel based on a destination address (e.g., a destination MAC address) of the packet (operation 408).

The tunnel endpoint encapsulates the packet with an encapsulation header associated with the tunnel (operation 410). The tunnel endpoint sets the local and remote tunnel endpoint identifiers (e.g., IP addresses) as source and destination addresses of the encapsulation header respectively. The tunnel endpoint determines an egress port associated with the tunnel (operation 414) and transmits the encapsulated packet via the determines egress port (operation 416).

Exemplary Switch

Figure 5:
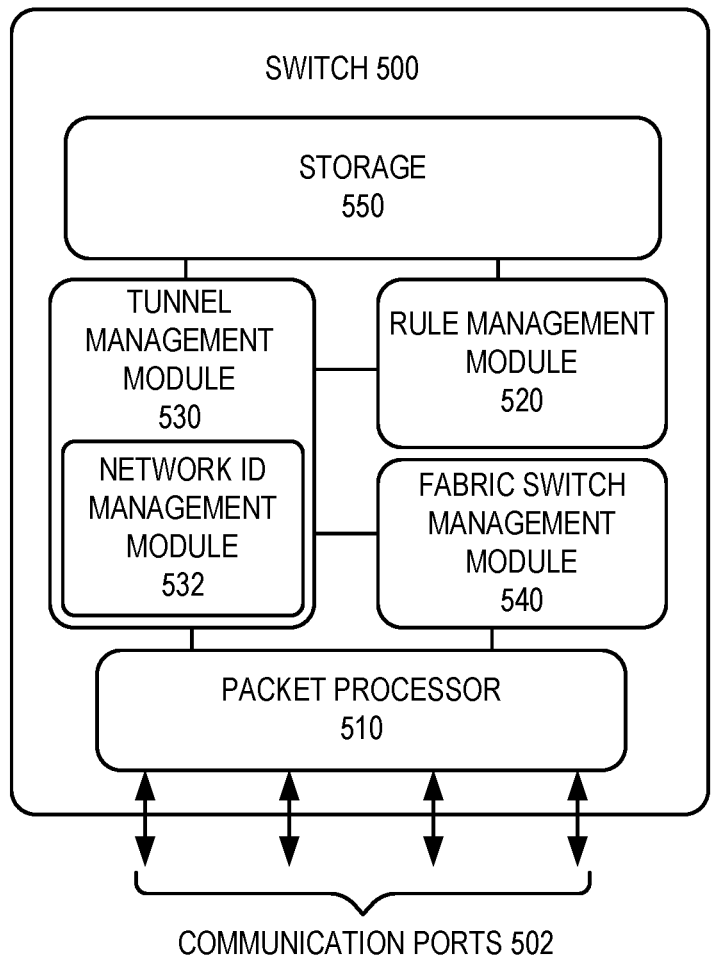
FIG. 5 illustrates an exemplary tunnel endpoint with rule-based network identifier mapping support for a tunnel, in accordance with an embodiment of the present invention.

FIG. 5 illustrates an exemplary tunnel endpoint with rule-based network identifier mapping support for a tunnel, in accordance with an embodiment of the present invention. In this example, a switch 500 includes a number of communication ports 502, a packet processor 510, a tunnel management module 530, a network identifier module 532, a rule management module 520, and a storage device 550. Switch 500 can also include switch modules, such as processing hardware of switch 500 (e.g., ASIC chips). Packet processor 510 extracts and processes header information from the received packets. Packet processor 510 can identify a switch identifier associated with the switch in the header of a packet.

In some embodiments, switch 500 maintains a membership in a fabric switch, as described in conjunction with FIG. 1, wherein switch 500 also includes a fabric switch module 540. Fabric switch module 540 maintains a configuration database in storage device 550 that maintains the configuration state of every switch within the fabric switch. Fabric switch module 540 maintains the state of the fabric switch, which is used to join other switches. In some embodiments, switch 500 can be configured to operate in conjunction with a remote switch as an Ethernet switch.

Communication ports 502 can include inter-switch communication channels for communication within the fabric switch. This inter-switch communication channel can be implemented via a regular communication port and based on any open or proprietary format. Communication ports 502 can also include one or more extension communication ports for communication between neighbor fabric switches. Communication ports 502 can include one or more TRILL ports capable of receiving frames encapsulated in a TRILL header. Communication ports 502 can also include one or more IP ports capable of receiving IP packets. An IP port is capable of receiving an IP packet and can be configured with an IP address. Packet processor 510 can process TRILL-encapsulated frames and/or IP packets (e.g., tunnel encapsulated packets).

During operation, tunnel management module 530 operates switch 500 as a tunnel endpoint and maintains a corresponding tunnel. Rule management module 520 obtains one or more rules. Network identifier management module 532 allocates network identifiers to a respective rule in a rule mapping table. Rule management module 520 can represent the rules based on locally learned MAC addresses and map them to the corresponding network identifier to a generate network identifier allocation table. Network identifier management module 532 obtains the remote MAC address to network identifier mapping from a MAC mapping table and updates a local MAC address table accordingly.

In some embodiments, tunnel management module 530 operates switch 500 as a distributed tunnel endpoint in conjunction with another switch for a plurality of service tunnels. Switch 500 and the other switch are associated with an IP address indicating the distributed tunnel endpoint. Packet processor 510 encapsulates the packet with an encapsulation header and sets the IP address as a source address of the encapsulation header. Tunnel management module 530 can elect a distribution master from switch 500 and the other switch.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch and a method that facilitate rule-based network identifiers for separation of traffic in a tunnel. In one embodiment, the switch includes a storage device, a rule management module, a network identifier module, and a packet processor. During operation, the rule management module determine a rule to classify traffic. The network identifier module then allocates a network identifier associated with a tunnel to the rule and stores a first mapping between the network identifier and a first media access control (MAC) address in the storage device. The first MAC address can be locally learned and represent the rule. The packet processor generates a control packet comprising the first mapping for a virtualization manager of a virtual machine and obtains a second mapping that maps a second MAC address of the virtual machine and an identifier of the tunnel to the network identifier from a notification packet from the virtualization manger.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a storage device;
   rule management circuitry configured to store, in the storage device, a first mapping that maps a virtual network identifier of a tunnel to a rule for classifying traffic, wherein the virtual network identifier identifies a virtualized network associated with the tunnel;
   network identifier circuitry configured to:
      generate, for a virtualization manager of a virtual machine, a control packet comprising a representation of the first mapping for a respective local end device; and
      obtain, from a notification packet from the virtualization manger, a second mapping that maps the virtual network identifier to an identifier of the virtual machine and an identifier of the tunnel.

2. The switch of claim 1, further comprising a packet processor configured to:
   encapsulate a packet destined to the virtual machine with an encapsulation header; and
   incorporate the virtual network identifier in the encapsulation header based on the second mapping.

3. The switch of claim 1, further comprising tunnel management circuitry configured to operate the switch as a tunnel endpoint for the tunnel, wherein the switch is associated with an Internet Protocol (IP) address assigned to the tunnel endpoint.

4. The switch of claim 3, wherein the tunnel endpoint operates based on a tunneling protocol, and wherein the tunneling protocol is one of: virtual extensible LAN (VX-LAN), generic routing encapsulation (GRE), network virtualization using GRE (NVGRE), layer-2 tunneling protocol (L2TP), and multi-protocol label switching (MPLS).

5. The switch of claim 1, wherein the role is based on one or more of: a flow definition, a flow identifier assigned to a flow defined by a flow definition, a media access control (MAC) address, an IP address, an IP subset, a customer VLAN tag, a service VLAN, and a global VLAN tag.

6. The switch of claim 5, wherein the flow definition identifies a packet belonging to a flow, and wherein the flow definition is based on one or more of: a source MAC address of the packet, a destination MAC address of the packet, a source IP address of the packet, a destination IP address of the packet, an ingress port of the tunnel endpoint, and a transport protocol port.

7. The switch of claim 1, wherein the switch is a member of a network of interconnected switches, which is identified based on a fabric identifier, wherein the network of interconnected switches operate as a tunnel endpoint for the tunnel.

8. The switch of claim 1, wherein the virtual network identifier is a VXLAN network identifier (VNI).

9. A method, comprising:
   storing, in local a storage device, a first mapping that maps a virtual network identifier of a tunnel to a rule for classifying traffic, wherein the virtual network identifier identifies a virtualized network associated with the tunnel;
   generating, for a virtualization manager of a virtual machine, a control packet comprising a representation of the first mapping for a respective local end device; and
   obtaining, from a notification packet from the virtualization manger, a second mapping that maps the virtual network identifier to an identifier of the virtual machine and an identifier of the tunnel.

10. The method, of claim 9, further comprising:
    encapsulating a packet destined to the virtual machine with an encapsulation header; and
    incorporating the virtual network identifier in the encapsulation header based on the second mapping.

11. The method of claim 9, further comprising operating the switch as a tunnel endpoint for the tunnel, wherein the switch is associated with an Internet Protocol (IP) address assigned to the tunnel endpoint.

12. The method of claim 11, wherein the tunnel endpoint operates based on a tunneling protocol, and wherein the tunneling protocol is one of: virtual extensible LAN (VX-LAN), generic routing encapsulation (GRE), network virtualization using GRE (NVGRE), layer-2 tunneling protocol (L2TP), and multi-protocol label switching (MPLS).

13. The method of claim 9, wherein the rule is based on one or more of: a flow definition, a flow identifier assigned to a flow defined by a flow definition, a media access control (MAC) address, an IP address, an IP subnet, a customer VLAN tag, a service VLAN, and a global VLAN tag.

14. The method of claim 13, wherein the flow definition identifies a packet belonging to a flow, and wherein the flow definition is based on one or more of:, a source MAC address of the packet, a destination MAC address of the packet, a source IP address of the packet, a destination IP address of the packet, an ingress port of the tunnel endpoint, and a transport protocol port.

15. The method of claim 9, wherein the switch is a member of a network of interconnected switches, which is identified based on a fabric identifier, wherein the network of interconnected switches operate as a tunnel endpoint for the tunnel.

16. The method of claim 9, wherein the virtual network identifier is a VXLAN network identifier (VNI).

17. A computer system; comprising;
- a storage device;
- a processor; and
- a non-transitory computer-readable storage medium storing instructions which when executed by the processor causes the processor to perform a method, the method comprising:
  - storing, in the storage device, a first mapping that maps a virtual network identifier of a tunnel to a rule for classifying traffic, wherein the virtual network identifier identifies a virtualized network associated with the tunnel;
  - generating, for a virtualization manager of a virtual machine, a control packet comprising a representation of the first mapping for a respective local end device; and
  - obtaining, from a notification packet from the virtualization manger, a second mapping that maps the virtual network identifier to an identifier of the virtual machine and an identifier of the tunnel.

18. The computer system of claim 17, wherein the method further comprises:
- encapsulating a packet destined to the virtual machine with an encapsulation header; and
- incorporating the virtual network identifier in the encapsulation header based on the second mapping.

19. The computer system of claim 18, wherein the method further comprises operating the switch as a tunnel endpoint for the funnel, wherein the switch is associated with an Internet Protocol (IP) address assigned to the tunnel endpoint.

20. The computer system of claim 18, wherein the rule is based on one or more of: a flow definition, a flow identifier assigned to a flow defined by a flow definition, a source MAC address, a source IP address, an IP subnet, a customer virtual area network (VLAN) tag, and a global VLAN tag.

* * * * *

UNITED STATES PATENT AND TRADEMARK OFFICE
CERTIFICATE OF CORRECTION

PATENT NO. : 10,237,090 B2
APPLICATION NO. : 15/462614
DATED : March 19, 2019
INVENTOR(S) : Ramakanth Josyula Page 1 of 1

It is certified that error appears in the above-identified patent and that said Letters Patent is hereby corrected as shown below:

In the Claims

Column 14, Claim 5, Line 3, delete "role" and insert --rule--;
Line 6, delete "subset" and insert --subnet--.

Column 16, Claim 19, Line 11, delete "funnel" and insert --tunnel--.

Signed and Sealed this
Nineteenth Day of November, 2019

Andrei Iancu
*Director of the United States Patent and Trademark Office*